March 25, 1941. H. HEUSER 2,236,059
METHOD OF MAKING COMMERCIAL COFFEE EXTRACT
Filed Jan. 7, 1939
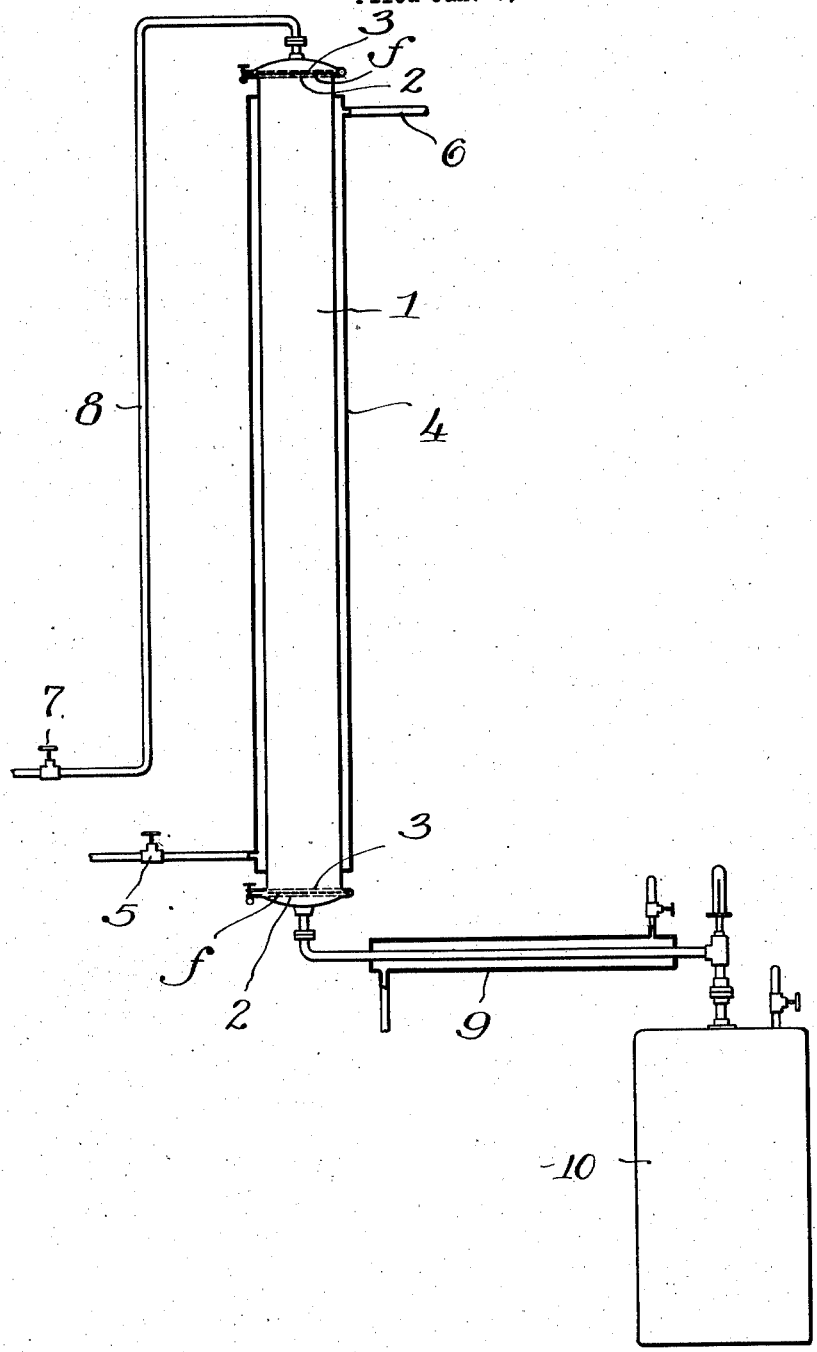
INVENTOR.
By Herman Heuser
Parkinson & Lane
ATTORNEYS.

Patented Mar. 25, 1941

2,236,059

UNITED STATES PATENT OFFICE 2,236,059

METHOD OF MAKING COMMERCIAL COFFEE EXTRACT

Herman Heuser, Evanston, Ill.

Application January 7, 1939, Serial No. 249,718

9 Claims. (Cl. 99—71)

My invention relates to the manufacture of coffee extract, that is to say, coffee extract of sufficient strength to make from a relatively small portion of it the coffee beverage by the addition of water, and more particularly my invention refers to a new method of making such an extract.

This application is a continuation in part of my copending application Serial No. 164,625, filed September 20, 1937.

The various methods which have been proposed in the art for making coffee extract are all more or less cumbersome, time consuming and wasteful both in extract and coffee aroma. They are based on repercolation or reinfusion as seen in Patents Nos. 228,889 and 229,697 to Gue, et al.; and in Patent No. 731,028 to Eschwege; and on maceration together with repercolation as seen in Patent No. 1,687,112 to Slocum et al.; and in Patent No. 1,891,383 to Giffen et al. They are also based on percolation followed by concentrating the percolate in a blast of hot air to a syrup as seen in Patent No. 1,393,045 to Scott; and on maceration followed by pressing out the grounds as seen in Patent No. 1,989,077 to Bredt; and further they are based on extracting the coffee by solvents such as benzine, benzole and carbon tetrachloride to separate the fat from the coffee followed by an extraction with water, the extract obtained by the fat solvents being added to the extract obtained by the water as solvent as seen in Patent No. 1,175,490 to Vietinghoff.

The products made by these prior methods, which may be termed successive methods or percolate-concentrating methods, have attained no commercial success due to the fact that they are all more or less poor in coffee flavor and coffee aroma because of the continuous rehandling of the percolate and they are too expensively produced because of the huge amount of extract remaining in the coffee grounds.

One of the objects of my invention is to produce a coffee extract distinguished by its excellency in taste and aroma.

A further object of my invention is to produce coffee extract in an economical and simple manner.

I have discovered that when water percolates through such a high or deep column of ground roasted coffee that only water under a superatmosphere pressure is able to percolate through the coffee, the percolate flowing from the coffee in the beginning of the operation has the consistency of a syrup, a heavy syrup in case of the use of water of an elevated temperature, and a light syrup in case of the use of water of a living room temperature.

Other objects, advantages and capabilities will later more fully appear.

In the drawing, the single view shows diagrammatically one form of apparatus for carrying out my invention.

In the following I will describe a method suitable to carry out my invention by an apparatus as shown in the drawing.

The apparatus consists of a closed pressure proof cylinder made of any suitable metal, which is so high that when the same is filled with ground roasted coffee to the top, only water under a superatmospheric pressure will pass through the coffee therein. The cylinder has its top as a door for the introduction of the coffee and its bottom as a door for the discharge of coffee grounds. The top and the bottom door of the cylinder are provided each with two screens 2 and 3, one close above the other, extending across the interior of the cylinder with a filter cloth $f$ between them to prevent floating of the coffee in the top of the column and to filter the liquid coming out of the coffee column. The cylinder is usually surrounded by a heating jacket 4 equipped with valve 5 for the introduction of the heating medium such as hot water, and with pipe 6 for the return of the hot water to the source of supply.

Coffee roasted in the customary fashion is ground to a suitable fineness. Thereupon an enclosed coffee column of the required height is made. This is done by filling the cylinder 1 through its top door with the ground roasted coffee up to the top and by hermetically closing the top door of the filled cylinder. Now hot water, kept under a superatmospheric pressure just high enough, say 15 pounds per square inch, to percolate the water through the coffee column, and produced by any suitable means as by a centrifugal pump or by a compressed inert gas, is flown through valve 7 of pipe 8 into the cylinder 1 and percolated through the enclosed column of coffee therein, while hot water of the same temperature as that used for the extraction of the coffee is preferably circulated through the heating jacket to prevent cooling of the cylinder walls during the extracting operation by the surrounding atmosphere.

As the water percolates through the coffee column, it gets unusually rich in extract passing from the coffee column in the beginning of the extracting operation as a heavy syrup. There is no volatilization of coffee aroma in the coffee column, all the aroma contained in the coffee being absorbed by the water percolating through the coffee. In order to prevent volatilization of coffee aroma from the percolate, the same is cooled to a sufficiently low temperature of, say 5° C., as it runs out of the coffee, as may be done by the pipe cooler 9 operated by cold brine or cold water connecting the extraction cylinder 1 with the insulated receiver 10, in which the percolate is collected.

The percolation of the water through the coffee column is continued until the concentration of the percolate in the receiver has been reduced to a concentration which is sufficiently high to make from a relatively small portion of the percolate the coffee beverage by the addition of water, and preferably also sufficiently low to leave only a relatively small portion of extract in the coffee grounds. Thus when the percolate in the receiver has a concentration corresponding, for example, to 25% of extract, the percolation is stopped, or it may be stopped when the percolate shows a considerably lower concentration corresponding, for example, to 12% of extract. With 25% of extract in the percolate only one teaspoonful of it is required for each cup of coffee beverage to be made from it by the addition of water, and with 12% of extract in the percolate one tablespoonful is required for each cup of coffee beverage to be made from it. I find that with an extract of 25% in the percolate, the extract left in the coffee grounds is approximately 2% to 3%, and with an extract of 12% in the percolate the extract left in the grounds is approximately 1% to 2% of the extract contained originally in the coffee. These losses in extract must be considered very small when compared with the huge losses in extract connected with the methods for making coffee extract proposed in the art, which are as high as 30% and more.

The coffee extract thus produced may be put up in hermetically sealed containers of any suitable kind, which are preferably sterilized to preserve the excellency in taste and aroma of the product therein for practically any length of time.

While I have found that an enclosed column of ground roasted coffee seven feet high will give satisfactory results, I do not wish to be limited to that particular height as my present invention contemplates any height of column of ground roasted coffee great enough that water under atmospheric pressure will not percolate therethrough, but that water under superatmospheric pressure will percolate therethrough with the results stated above.

Having now described my invention, I claim:

1. The method of extracting coffee which comprises roasting coffee in the customary manner, grinding the coffee to a suitable fineness, providing an enclosed column of the ground roasted coffee which is so high that only water under a superatmospheric pressure will percolate through the coffee, and percolating such water through the coffee.

2. The method of making coffee extract which comprises providing an enclosed column of ground roasted coffee which is so high that only water under a superatmospheric pressure will percolate through the coffee, percolating such water through the coffee whereby the percolate flowing out of the coffee column in the beginning of the extracting operation is a syrup, and stopping the percolation when the collected percolate shows a concentration which is sufficiently high to make from a relatively small portion of the percolate the coffee beverage by the addition of water, and preferably also sufficiently low to leave only a relatively small portion of extract in the coffee grounds.

3. The method as set forth in claim 2, in which the water percolating through the coffee is water of an elevated temperature and in which the percolate from the coffee is cooled to a sufficiently low temperature to prevent volatilization of the coffee aroma from the percolate.

4. The step in the method of making coffee extract which consists in providing an enclosed column of ground roasted coffee which is so high that only water under a superatmospheric pressure will percolate through the coffee.

5. The method as set forth in claim 2 in which in the beginning of the extracting operation the percolate has the concentration of a syrup and in which at the end of the extracting operation the collected percolate shows a concentration corresponding to an extract of approximately 12% to 25%.

6. The method of making coffee extract which consists in providing an enclosed column of ground roasted coffee of such height that water under atmospheric pressure will be unable to percolate through the column, forcing into one end of the column water under superatmospheric pressure, percolating said water through the column and then flowing it out of the column in the form of a syrup.

7. The method of making coffee extract which consists in providing an enclosed column of ground roasted coffee of such height that water under atmospheric pressure will be unable to percolate through the column, forcing into one end of the column water under superatmospheric pressure, percolating said water through the column and then flowing it out of the column in the form of a syrup, collecting the syrup and continuing to percolate water under superatmospheric pressure through the column, and flowing it into the collected syrup until the collected percolate shows a concentration corresponding to an extract of approximately 12% to 25%.

8. The method of making coffee extract which consists in providing an enclosed column of ground roasted coffee of such height that water under atmospheric pressure will be unable to percolate through the column, forcing into one end of the column water under superatmospheric pressure, percolating said water through the column and then flowing it out of the column in the form of a syrup, collecting the syrup and continuing to percolate water under superatmospheric pressure through the column, and flowing it into the collected syrup until the collected percolate shows a concentration corresponding to an extract of approximately 12% to 25%, the percolation being carried on substantially out of contact with air to prevent loss of the coffee aroma from the percolate.

9. The method of making coffee extract comprising providing an enclosed column of ground roasted coffee which is so high that only water under superatmospheric pressure will percolate through the coffee, hermetically sealing said column, percolating heated water under superatmospheric pressure through the coffee while maintaining the temperature of the water, flowing the resultant extract away from the column and cooling the resultant extract in order to prevent volatilization of the coffee aroma therefrom.

HERMAN HEUSER.